United States Patent
Wagner

(10) Patent No.: US 6,889,710 B2
(45) Date of Patent: May 10, 2005

(54) ROTARY SEQUENCING VALVE WITH FLEXIBLE PORT PLATE

(75) Inventor: Glenn Paul Wagner, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 204 days.

(21) Appl. No.: 10/295,144

(22) Filed: Nov. 15, 2002

(65) Prior Publication Data

US 2004/0094216 A1 May 20, 2004

(51) Int. Cl.⁷ .............................................. F16K 11/10
(52) U.S. Cl. .................................. 137/625.46; 251/185
(58) Field of Search ..................... 137/625.46; 251/180, 251/181, 185

(56) References Cited

U.S. PATENT DOCUMENTS

| | | | |
|---|---|---|---|
| 3,040,777 A | | 6/1962 | Carson et al. ......... 137/625.15 |
| 3,230,048 A | | 1/1966 | Skeggs |
| 3,297,053 A | * | 1/1967 | McKinney ............. 137/625.46 |
| 3,422,848 A | | 1/1969 | Liebman et al. ....... 137/625.15 |
| 3,747,630 A | * | 7/1973 | Hurrell ....................... 137/312 |
| 3,948,286 A | | 4/1976 | Dunbar et al. .............. 137/609 |
| 4,112,973 A | * | 9/1978 | Klie ....................... 137/625.21 |
| 5,366,541 A | | 11/1994 | Hill et al. ...................... 96/124 |
| 5,807,423 A | | 9/1998 | Lemcoff et al. ................ 95/96 |
| 5,814,130 A | | 9/1998 | Lemcoff et al. ................ 95/96 |
| 5,814,131 A | | 9/1998 | Lemcoff et al. ................ 95/96 |
| 5,820,656 A | | 10/1998 | Lemcoff et al. ................ 95/96 |
| 5,891,217 A | | 4/1999 | Lemcoff et al. ................ 95/96 |
| 6,063,161 A | | 5/2000 | Keefer et al. ................. 95/100 |
| 6,311,719 B1 | | 11/2001 | Hill et al. ..................... 137/312 |
| 6,367,504 B1 | * | 4/2002 | Knapp ......................... 251/285 |
| 2002/0124885 A1 | | 9/2002 | Hill et al. ..................... 137/312 |

FOREIGN PATENT DOCUMENTS

| | | | |
|---|---|---|---|
| GB | 482955 | 4/1938 | |
| JP | 131750 | 5/1996 | ........... B01D/53/04 |
| JP | 210524 | 8/1996 | ............. F16K/3/08 |
| WO | WO 99/18378 | 4/1999 | |

\* cited by examiner

*Primary Examiner*—John Fox
(74) *Attorney, Agent, or Firm*—Keith D. Gourley

(57) ABSTRACT

Rotary sequencing valve comprising a rotor having a rotor face rotatable about an axis perpendicular to the rotor face, wherein the rotor face has a plurality of openings, one or more of which are disposed at a selected radial distance from the axis, and wherein the rotor includes at least one passage connecting at least one pair of the plurality of openings. The valve includes a flexible port plate having a first side and a second side, wherein the first side faces the rotor and engages the rotor such that the flexible port plate can be rotated coaxially by the rotor and can move axially with respect to the rotor, wherein the flexible port plate has a plurality of ports between the first and second sides, which ports are aligned with the openings in the rotor face. The valve also includes a stator having a stator face disposed coaxially with the rotor and the flexible port plate, wherein the second side of the flexible port plate is in sealable, slidable rotary contact with the stator face, wherein the stator face has a plurality of openings, some of which are disposed at the selected radial distance from the axis, and wherein the plurality of openings extend as passages through the stator. The valve may be used in pressure or temperature swing adsorption systems.

12 Claims, 8 Drawing Sheets

ROTARY SEQUENCING VALVE WITH FLEXIBLE PORT PLATE

STATEMENT REGARDING FEDERALLY SPONSORED RESEARCH OR DEVELOPMENT

This invention was made with government support under Contract No. DE-FC04-02AL67613 between Air Products and Chemicals, Inc. and the U.S. Department of Energy. The Government has certain rights to this invention.

BACKGROUND OF THE INVENTION

Rotary valves are widely used in the process industries for directing fluids from one or more process sources to one or more process destinations in repeatable cyclic process steps. These valves, also called rotary sequencing valves, are used in cyclic or repeatable processes such as gas separation by pressure or temperature swing adsorption, liquid separation by concentration swing adsorption, gas or liquid chromatography, regenerative catalytic processes, pneumatic or hydraulic sequential control systems, and other cyclic processes.

One type of rotary valve has a cylindrical configuration in which inner or outer cylinders with properly positioned ports and seals rotate relative to one another such that ports in the inner and outer cylinders are aligned and/or blocked in a predetermined cyclic sequence. Another type of rotary valve has a flat circular configuration in which a flat ported rotor rotates coaxially on a flat ported stator such that ports in the stator and rotor are aligned or blocked in a predetermined cyclic sequence. Sealing typically is provided by direct contact of the flat rotor face sliding over the flat stator face. A high degree of precision is required in the fabrication of these flat surfaces to prevent excessive leakage at the mating surfaces. Rigid materials such as metal, carbon, or ceramic typically are used for rotors and stators, and wear of the parts or distortions caused by temperature differentials will cause changes in the shape of the surfaces, thereby allowing leakage across the seal formed between the surfaces. A sheet of deformable material may be bonded to the rotor or stator face to improve the seal between the rotor and stator.

Rotary circular valves with a flat circular configuration are particularly useful in pressure swing adsorption systems utilizing multiple parallel adsorber beds operating in overlapping cyclic steps which include feed, pressure equalization, depressurization, purge, and repressurization steps. As the size and throughput of an adsorption system increases, the diameters of the circular rotary valves also increase. As these valves increase in diameter, typically above about six inches, it becomes increasingly expensive to machine rotor and stator surfaces with the high degree of flatness required for proper fluid sealing between the rotor and stator faces. In addition, larger valve sizes magnify the problem of deviations from flatness caused by wear between the surfaces, thermal distortion of the mating parts, internal manufacturing stresses, or stresses from the pressure of the fluid flowing through the valve.

These problems are addressed by embodiments of the present invention, as described below and defined by the claims which follow, providing an improved rotary valve that alleviates sealing problems caused by flatness deviations due to rotor and stator fabrication, and also compensates for wear and thermal distortion during valve operation.

BRIEF SUMMARY OF THE INVENTION

Embodiments of the present invention relate to a rotary sequencing valve comprising a rotor having a rotor face rotatable about an axis perpendicular to the rotor face, wherein the rotor face has a plurality of openings, one or more of which are disposed at a selected radial distance from the axis, and wherein the rotor includes at least one passage connecting at least one pair of the plurality of openings. The valve includes a flexible port plate having a first side and a second side, wherein the first side faces the rotor and engages the rotor such that the flexible port plate can be rotated coaxially by the rotor and can move axially with respect to the rotor, wherein the flexible port plate has a plurality of ports between the first and second sides, which ports are aligned with the openings in the rotor face. The valve also includes a stator having a stator face disposed coaxially with the rotor and the flexible port plate, wherein the second side of the flexible port plate is in sealable, slidable rotary contact with the stator face, wherein the stator face has a plurality of openings, some of which are disposed at the selected radial distance from the axis, and wherein the plurality of openings extend as passages through the stator.

The rotary sequencing valve may further comprise flow restricting means disposed in the passage connecting the pair of openings for restricting the flow of fluid through the passage.

In an embodiment of the invention, one rotary position of the rotor and the port plate about the axis places a pair of openings in the stator in flow communication with a pair of openings in the flexible port plate, the pair of openings in the rotor face, and the passage in the rotor that connects the pair of openings in the rotor face. Another rotary position of the rotor and the port plate about the axis places another pair of openings in the stator in flow communication with the pair of openings in the flexible port plate, the pair of openings in the rotor face, and the passage in the rotor that connects the pair of openings in the rotor face.

One or more of the ports extending through the port plate may be arcuate slots, each of which forms a circumferential passageway for fluid flow between an opening in the rotor face and an opening in the stator face.

Another embodiment of the invention includes a rotary sequencing valve comprising:

(a) a rotor equipped to rotate about an axis, wherein the rotor includes a rotor face perpendicular to the axis, a plurality of openings in the rotor face, one or more of which are disposed at a selected radial distance from the axis, and a passage extending between a pair of the openings in the rotor face that places the pair of openings in flow communication;

(b) a flexible port plate having a first surface, a second surface, a plurality of ports extending through the port plate from the first surface to the second surface, wherein the ports in the port plate are aligned with the openings in the rotor;

(c) axially slidable connecting means extending between the rotor and the first surface of the flexible port plate such that the rotor and port plate can rotate together about the axis;

(d) elastic sealing means in sealable contact with the rotor face and in sealable contact with the first surface of the flexible port plate, wherein the elastic sealing means provides a seal surrounding each opening in the rotor face and a seal surrounding each port on the first surface of the flexible port plate so that each opening in the rotor face is in flow communication with each port aligned with that opening;

(e) a stator having a stator face disposed coaxially with the rotor and the flexible port plate, wherein the second side of the flexible port plate is in sealable, slidable rotary contact with the stator face, a plurality of openings in the stator face, some of which are disposed at the selected radial distance from the axis, and a plurality of passages extending through the stator, each passage extending through the stator from each of the openings in the stator face, respectively.

In this embodiment, one rotary position of the rotor and port plate about the axis aligns a pair of ports with a pair of openings in the stator face, another rotary position of the rotor and port plate about the axis aligns the pair of ports with another pair of openings in the stator face, and yet another rotary position of the rotor and port plate about the axis blocks one or more of the openings in the stator face.

The rotary sequencing valve typically comprises rotary drive means for rotating the rotor and port plate. The rotary drive means can be operated to drive the rotor and port plate continuously at a constant rotational speed or to position the rotor and port plate discontinuously in a repeatable rotational cycle.

The axially slidable connecting means extending between the rotor and the first surface of the flexible port plate may comprise cylindrical drive pins on the rotor face which fit into cylindrical drive pin sockets in the first surface of the port plate. The rotary sequencing valve may include means for pressing the rotor face against the elastic sealing means.

The elastic sealing means may be selected from the group consisting of (a) grooves surrounding each opening in the first surface of the port plate and elastic O-rings inserted in the grooves, wherein the O-rings protrude beyond the first surface and sealaby contact the rotor face surrounding each opposing opening in the rotor face;

(b) grooves surrounding each opening in the rotor face and elastic O-rings inserted in the grooves, wherein the O-rings protrude beyond the rotor face and sealably contact the first surface of the port plate surrounding each opposing opening in the port plate;

(c) a sheet of elastic material having a first side adjacent to the first surface of the port plate and a second side adjacent to the rotor face, wherein the sheet has openings which are similar in shape and size to the ports in the port plate, and the first and second sides of the sheet each have raised regions surrounding each opening therein that sealably contact the rotor face surrounding each opposing opening therein and sealably contact the first surface around opposing ports in the port plate;

(d) raised regions of elastic material attached to the first surface of the port plate around each port in the port plate; and (e) raised regions of elastic material attached to the rotor face around each opening in the rotor face.

Embodiments of the invention include a port plate for use between the rotor and the stator of a rotary sequencing valve, the port plate comprising flexible material having a first surface, a second surface, an axis perpendicular to the second surface, and a plurality of ports extending through the port plate from the first surface to the second surface, wherein one or more of the ports are disposed at a selected radial distance from the axis. The port plate may further comprise grooves in the first surface thereof, wherein each groove surrounds a closed region on the first surface, some or all of the grooves surround ports, elastic O-rings are inserted in the grooves, and the O-rings protrude beyond the first surface of the port plate. The port plate may include at least two drive pin sockets for axially and slidably receiving drive pins to rotate the port plate around the axis.

Various embodiments of the invention also include a rotor and port plate assembly for use in a rotary sequencing valve. The assembly comprises a rotor equipped to rotate about an axis, wherein the rotor includes a rotor face perpendicular to the axis, a plurality of openings in the rotor face including a first opening and a second opening, and a passage extending between the first opening and the second opening that places them in flow communication, wherein one or more of the openings in the rotor face are disposed at a selected radial distance around the axis. The assembly includes a flexible port plate having a first surface, a second surface, a plurality of ports extending through the port plate including a first port and a second port, wherein the first opening in the rotor face is aligned with the first port in the port plate and the second opening in the rotor face is aligned with the second port in the port plate. The assembly also comprises axially slidable connecting means extending axially between the rotor and the first surface of the flexible port plate such that the rotor and the port plate can rotate together about the axis, and elastic sealing means in sealable contact with the first surface of the flexible port plate and with the rotor face.

Other embodiments of the invention include a rotary sequencing product valve for use at the product ends of four parallel adsorber vessels in a four-bed pressure swing adsorption process, wherein each vessel has a feed and a product end. The valve comprises:

(a) a rotor equipped to rotate about an axis, wherein the rotor includes a rotor face perpendicular to the axis; seven openings in the rotor face wherein a first opening intersects the axis and the other six openings are disposed at a selected radial distance from the axis; a passage extending between the first opening and a second opening, a passage extending between the first opening and a third opening, a passage extending between a fourth opening and a fifth opening, and a passage extending between a sixth opening and a seventh opening, respectively, thereby placing the first, second, and third openings in flow communication, the fourth and fifth openings in flow communication, and the sixth and seventh openings in flow communication;

(b) a flexible port plate having a first surface, a second surface, and six ports extending through the port plate, wherein the ports in the port plate and the openings in the rotor face are aligned and in flow communication as follows: a first port with the first opening, a second port with the second and seventh openings, a third port with the third opening, a fourth port with the fourth opening, a fifth port with the fifth opening, and a sixth port with the sixth opening;

(c) axially slidable connecting means extending between the rotor and the first surface of the flexible port plate such that the rotor and the port plate can rotate together about the axis;

(d) elastic sealing means in sealable contact with the first surface of the flexible port plate and the rotor face, wherein the elastic sealing means seals the first port to the first opening, the second port to the second and seventh openings, the third port to the third opening, the fourth port to the fourth opening, the fifth port to the fifth opening, and the sixth port to the sixth opening, respectively; and (e) a stator having a stator face in sealable and slidable contact with the second surface of the flexible port plate and disposed coaxially relative to the rotor and port plate; five openings in the stator face wherein a first opening intersects the axis and the other four openings are disposed at the selected radial distance from the axis; and five passages extending through the stator from each of the five openings in the stator face, respectively, wherein the first opening in the stator face is in flow communication via a first passage with a product delivery line, and wherein each of the other four openings in the stator face is in flow communication via each of the other passages with the product end of a first, a second, a third, and a fourth adsorber vessel, respectively.

This rotary sequencing product valve may be operated such that (1) in a first rotary position of the rotor and port plate about the axis, the openings in the rotor, ports in the port plate, and openings in the stator are aligned to place the product end of the first adsorber vessel in flow communication with the product delivery line and with the product end of the second adsorber vessel, and to place the product ends of the third and fourth adsorber vessels in flow communication; and (2) in a second rotary position of the rotor and port plate about the axis, the openings in the rotor, ports in the port plate, and openings in the stator are aligned to place the product end of the first adsorber vessel in flow communication with the product delivery line and with the product end of the second adsorber vessel, and to place the product ends of the second and fourth adsorber vessels in flow communication.

The rotary sequencing product valve may further comprise a drive shaft equipped to rotate the rotor about the axis, a valve housing sealably attached to the stator wherein the valve housing surrounds the rotor, port plate, and elastic sealing means, wherein the drive shaft passes through the valve housing and is rotatably sealed to the housing so that the housing has a fluid-tight interior.

In a related embodiment, the invention includes a rotary sequencing feed valve for use at the feed ends of four parallel adsorber vessels in a four-bed pressure swing adsorption process, each vessel having a feed and a product end. The valve comprises:

(a) a rotor equipped to rotate about an axis, wherein the rotor includes a rotor face perpendicular to the axis, two openings in the rotor face wherein a first opening intersects the axis and a second opening is disposed at a selected radial distance from the axis, and a passage that extends between the first and second openings to place the first and second openings in flow communication;

(b) a flexible port plate having a first surface, a second surface, and three ports extending through the port plate, wherein a first port in the port plate is aligned and in flow communication with the first opening in the rotor face and a second port in the port plate is aligned and in flow communication with the second opening in the rotor face;

(c) axially slidable connecting means extending between the rotor and the first surface of the flexible port plate such that the rotor and the port plate can rotate together about the axis;

(d) elastic sealing means in sealable contact with the first surface of the flexible port plate and the rotor face, wherein the elastic sealing means seals the first port to the first opening and the second port to the second opening, respectively; and (e) a stator having a stator face in sealable and slidable contact with the second surface of the flexible port plate and disposed coaxially relative to the rotor and port plate; five openings in the stator face wherein a first opening intersects the axis and the other four openings are disposed at the selected radial distance from the axis; and five passages, each passage extending through the stator from each of the five openings in the stator face, respectively, wherein the first opening in the stator face is in flow communication via a first passage with a waste discharge line and wherein each of the other four openings in the stator face is in flow communication via each of the other passages with the feed end of a first, a second, a third, and a fourth adsorber vessel, respectively.

The rotary sequencing feed valve may further comprise a drive shaft equipped to rotate the rotor about the axis, a valve housing sealably attached to the stator wherein the valve housing surrounds the rotor, port plate, and elastic sealing means, wherein the drive shaft passes through the valve housing and is rotatably sealed to the housing so that the housing has a fluid-tight interior, and a feed inlet line connected to the housing in flow communication with the fluid-tight interior.

In the rotary sequencing feed valve, the port plate may be circular and a third port in the port plate may be formed by removing a portion of a sector of the port plate extending from the periphery of the port plate to a radial distance from the axis which is less than the selected radial distance, and wherein the third port is in direct flow communication with the interior of the valve housing.

The rotary sequencing feed valve may be operated such that (1) in a first rotary position of the rotor and port plate about the axis, the openings in the rotor, ports in the port plate, and openings in the stator are aligned to place the feed end of the first adsorber vessel in flow communication with the feed inlet line and to place the feed end of the third adsorber vessel in flow communication with the waste discharge line; and (2) in a second rotary position of the rotor and port plate about the axis, the openings in the rotor, ports in the port plate, and openings in the stator are aligned to place the feed end of the second adsorber vessel in flow communication with the feed inlet line and to place the feed end of the fourth adsorber vessel in flow communication with the waste discharge line.

Another embodiment of the invention includes a rotary sequencing valve assembly for a pressure swing adsorption system which uses a plurality of parallel adsorber vessels, each vessel having a feed end and a product end, wherein the rotary sequencing valve assembly comprises:

(1) a rotary sequencing feed valve comprising
(a) a rotor having a rotor face rotatable about an axis perpendicular to the rotor face and a coaxial drive shaft, wherein the rotor face has a plurality of openings, one or more of which are disposed at a selected radial distance from the axis, and wherein the rotor includes a passage connecting a pair of the openings;
(b) a flexible port plate having a first side and a second side, wherein the first side engages the rotor such that the flexible port plate can be rotated coaxially by the rotor and can move axially with respect to the rotor, wherein the flexible port plate has a plurality of ports between the first and second side, and wherein two of the ports are aligned with the openings in the rotor face; and
(c) a stator having a stator face disposed coaxially with the rotor and the flexible port plate, wherein the second side of the flexible port plate is in sealable, slidable rotary contact with the stator face, wherein the stator face has a plurality of openings, some of which are disposed at the selected radial distance from the axis, wherein the openings extend as passages through the stator, wherein one of the openings in the stator face is in flow communication with a waste discharge line, and wherein each of the other openings in the stator face is in flow communication with the feed end of each of the plurality of adsorber vessels, respectively;

(2) a rotary sequencing product valve comprising
   (a) a rotor having a rotor face rotatable about an axis perpendicular to the rotor face and a coaxial drive shaft, wherein the rotor face has a plurality of openings, one or more of which are disposed at a selected radial distance from the axis, and wherein the rotor includes a passage connecting a pair of the openings;
   (b) a flexible port plate having a first side and a second side, wherein the first side engages the rotor such that the flexible port plate can be rotated coaxially by the rotor and can move axially with respect to the rotor, wherein the flexible port plate has a plurality of ports between the first and second side, and wherein the ports are aligned with the openings in the rotor face; and
   (c) a stator having a stator face disposed coaxially with the rotor and the flexible port plate, wherein the second side of the flexible port plate is in sealable, slidable rotary contact with the stator face, wherein the stator face has a plurality of openings, some of which are disposed at the selected radial distance from the axis, wherein the openings extend as passages through the stator, wherein one of the openings in the stator face is in flow communication with a product delivery line, and wherein each of the other openings in the stator face is in flow communication with the product end of each of the plurality of adsorber vessels, respectively; and (3) rotary drive means to rotate the drive shaft of the rotary sequencing feed valve and the drive shaft of the rotary sequencing product valve.

The rotary drive means may comprise a motor-driven system that turns the drive shafts of both the rotary sequencing product valve and the rotary sequencing feed valve. The motor-driven system may turn the drive shafts of both the rotary sequencing product valve and the rotary sequencing feed valve at the same speed. The drive shafts of both the rotary sequencing product valve and the rotary sequencing feed valve may form a single drive shaft. The rotary sequencing feed valve may further comprise a drive shaft equipped to rotate the rotor about the axis, a valve housing sealably attached to the stator wherein the valve housing surrounds the rotor, port plate, and elastic sealing means, wherein the drive shaft passes through the valve housing and is rotatably sealed to the housing so that the housing has a fluid-tight interior, and a feed inlet line connected to the housing in flow communication with the fluid-tight interior.

DETAILED DESCRIPTION OF THE INVENTION

Rotary sequencing valves, in which a flat ported rotor rotates coaxially on a flat ported stator wherein ports in the stator and rotor are aligned or blocked in a predetermined cyclic sequence, are used for directing fluids in cyclic processes having a number of repeatable steps. Embodiments of the present invention are directed to rotary sequencing valves which utilize a flexible port plate disposed between the stator and rotor of the rotary sequencing valve. The flexible port plate, which is made of flexible material, is connected to the rotor and is turned by the rotor such that a flat face on one side of the port plate rotates slidably and sealably on the flat stator face. The other side of the port plate contacts the rotor face such that openings or ports in the rotor face are aligned with and in sealable fluid flow communication with ports in the port plate. The ports in the port plate align sequentially with openings in the stator face as the rotor and port plate rotate together, and sealing at the interface between the port plate and stator face is provided by contact between the flexible material of the port plate and the stator as the two parts slide relative to one another.

Figure 1:
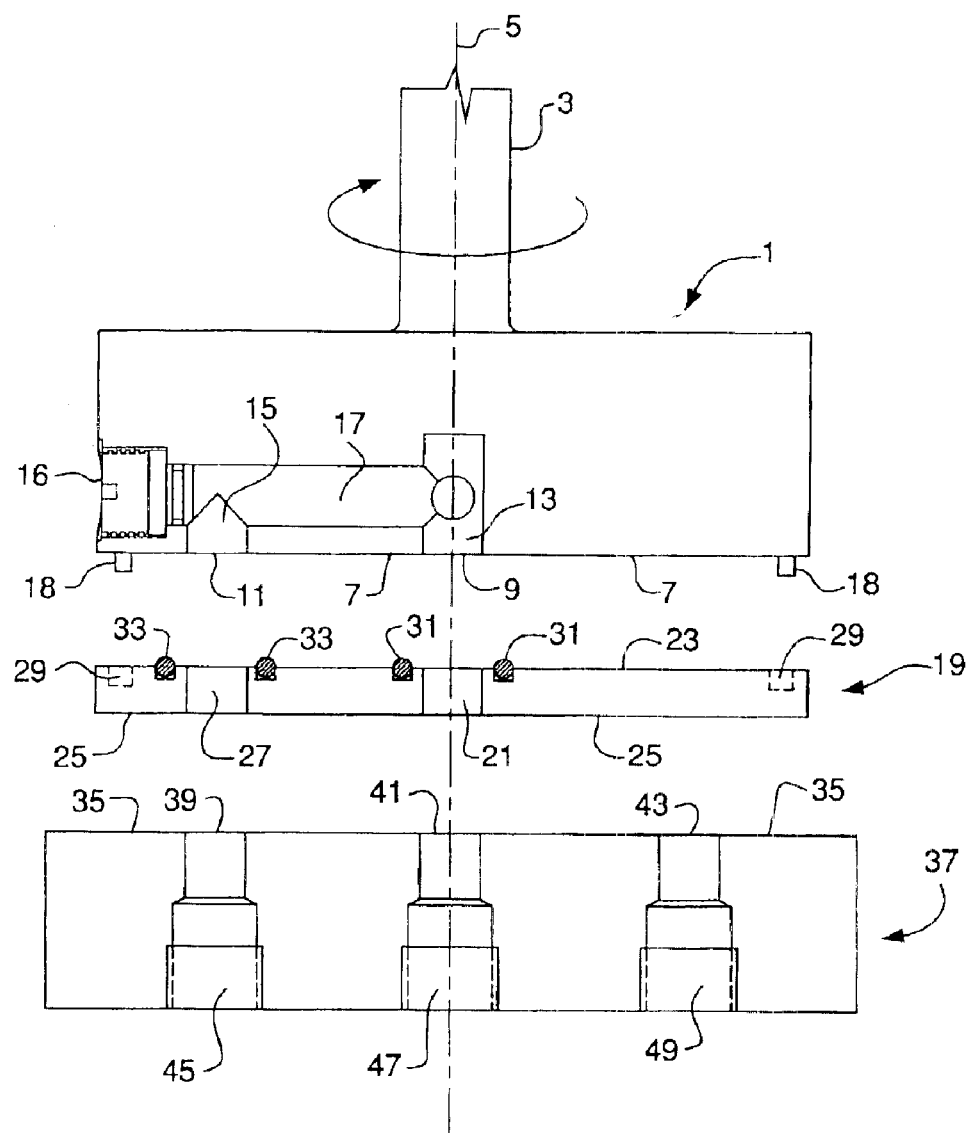
FIG. 1 is a schematic cross section illustrating an embodiment of a rotary sequencing valve of the present invention.

FIG. 1 shows an exploded sectional view illustrating a center cross section of an exemplary embodiment of the rotary sequencing valve. Rotor 1 is attached to drive shaft 3 that rotates the rotor around axis 5. The rotor may be made of metal, ceramic, carbon, or other rigid material that is compatible with the fluid flowing through the valve. Rotor face 7 has opening 9 that intersects axis 5 and has opening 11 at a selected radial distance from axis 5. Vertical bore 13, vertical bore 15, and horizontal bore 17 form an internal passageway that connects openings 9 and 11 and places them in fluid flow communication. Plug 16 may be used to close the outer end of horizontal bore 17. The passage formed by horizontal bore 17 may include flow restricting means (not shown) such as an orifice assembly to restrict or control the flow of fluid through the bore. Other alternative flow restricting means may be used to control fluid flow through the passage such as, for example, an adjustable flow control valve. The rotor may have additional openings and passages (not shown) as discussed later, and these also may include flow restricting means. In one embodiment, at least two drive pins 18 project from rotor face 7.

Rotor face 7 is perpendicular to shaft 3 and axis 5 and preferably is essentially flat, which means that the face is fabricated to be as flat as practical using conventional machining and grinding methods. Advanced fabrication methods such as lapping or other highly specialized and expensive processes are not required to provide extreme flatness. The rotor face should have a sufficiently smooth finish so that fluid-tight seals can be formed around openings in the rotor face as described later.

As an alternative embodiment to the internal passage formed by vertical bore 13, vertical bore 15, and horizontal bore or passage 17 to connect openings 9 and 11, the rotor can be designed and fabricated such that bore 11 and bore 13 pass through the top of the rotor, horizontal bore or passage 17 is not used, and bore 11 and bore 13 are connected by an external passage or pipe. This alternative may be desirable if the number and orientation of internal passages complicates the machining steps in rotor fabrication. This alternative external passage or pipe may include flow restricting means such as an orifice assembly to control the flow of fluid through the bore. Other alternative flow restricting means may be used to restrict or control fluid flow through the passage such as, for example, an adjustable flow control valve.

Port plate 19 is disposed adjacent to rotor face 7 and has central port 21 passing through the port plate from first side or surface 23 to second side or surface 25. Port 21 intersects axis 5 and is axially opposite or aligned with opening 9. Port 27, disposed at a selected radial distance from axis 5, extends through the port plate from first side or surface 23 to second side or surface 25. This port may be arcuate in shape as described later. Port 27 is opposite or aligned with opening 11. A port and an opening in the rotor face are aligned by definition when they are in flow communication, that is, when fluid can flow directly between an aligned port and opening.

Flexible port plate 19 engages rotor 1 such that the port plate can be rotated about axis 5 by rotor 1 and the port plate can move axially with respect to the rotor. Any engaging means may be used to engage port plate 19 with rotor 1 or rotor face 7 as long as the engaging means allows axial movement of the port plate with respect to the rotor. The engaging means also may be defined as axially slidable engaging means, one of which is illustrated in FIG. 1, wherein surface 23 of port plate 19 may have at least two drive pin sockets 29 positioned to slidably receive drive pins 18 when rotor face 7 is moved axially towards first surface 23 of port plate 19. These pins rotate the port plate while allowing the port plate to move axially with respect to rotor 1. Other axially slidable engaging means can be envisioned which are within the scope of the embodiments of the present invention. For example, the port plate may be attached to the rotor using recessed screws that do not clamp the port plate tightly to the rotor, but allow the port plate to move axially with respect to the rotor and prevent the port plate from becoming disengaged from the rotor.

Port plate 19 preferably is made of a material with a low modulus of elasticity and has a thickness such that it is flexible relative to the rotor and stator materials. The port plate material also should have a low coefficient of friction relative to the stator material and should be compatible with the fluid flowing through the valve. A suitable material for the port plate may be selected from materials such as, for example, polytetrafluoroethylene (PTFE), carbon- or bronze-filled PTFE, polyoxymethylene or acetal (for example, Delrin®), nylon, or polyetheretherketone (PEEK). The port plate should have an appropriate degree of flexibility so that it can conform to any deviations from flatness of the stator face as described below. The degree of flexibility of the port plate is a function of the modulus of the port plate material and the thickness of the port plate. In a typical embodiment, the thickness of the port plate may be in the range of 1/16 inch to 1/2 inch.

Each of the port openings in first surface 23 of port plate 19 is surrounded by elastic sealing means which seals the port opening to an opposite opening in rotor face 7. The elastic sealing means preferably comprises elastic material which sealably contacts rotor face 7 and may be sealably attached to or in sealable contact with port plate 19. The elastic material preferably allows a slight axial motion of port plate 19 relative to rotor face 7 when first surface 23 and rotor face 7 are pressed together in contact with the elastic sealing means. First surface 23 of port plate 19 typically does not contact rotor face 7.

In one embodiment of the elastic sealing means shown in FIG. 1, grooves are cut into first surface 23 around ports 21 and 27 in port plate 19. O-rings 31 and 33 are inserted into the grooves around ports 21 and 27, respectively, and the depth of the grooves is less than the diameter of the O-ring cross section such that the O-rings protrude above or beyond first surface 23 as shown. Rotor face 7 is pressed against O-rings 31 and 33 (and optionally against other O-rings not shown here), which in turn presses flat second surface 25 of port plate 19 against flat stator face 35. The compression of the O-rings is on the order of tens of thousandths of an inch, so it is much greater than the size of any deviation from the flatness of stator face 35. The flexible material of the port plate 19 conforms to any out-of-flatness imperfections in stator face 35 as it slides in rotary motion over stator face 35, thereby maintaining a fluid seal. While this embodiment has been described for O-rings having a circular cross-section, rings having other cross-sectional shapes may be used as desired.

The O-rings can be made of any appropriate material with sufficient elasticity and compatible with the fluid flowing through the valve. Exemplary materials that can be used for the O-rings include, for example, nitrile rubber, neoprene, ethylene propylene, and fluoroelastomers such as Viton®.

O-rings 31 and 33 serve several functions because of their elastic properties. First, they force second surface 25 of port plate 19 against stator face 35; second, they maintain a seal on first surface 23 around the ports in the port plate and on rotor face 7 around openings 9 and 11; third, they prevent leakage between rotor face 7 and first surface 23 of port plate 19 as the port plate flexes relative to stator face 35; and fourth, they allow port plate 19 to move slightly in the axial direction relative to stator 37 to compensate for wear of second surface 25 as port plate 19 rotates against stator face 35. This axial movement also can compensate for distortion of stator face 35 that may be caused by thermal gradients or fluid pressure loads.

In an alternative embodiment, the grooves could be cut into rotor face 7 around openings 9 and 11 (not shown)

rather than being cut in port plate 19 as described above. The O-rings then would ride in the rotor and press against first surface 23 of port plate 19. Drive pins 18 would fit into drive pin sockets 29 as described above. In another embodiment, the elastic sealing means may comprise a sheet of elastic material having a first side adjacent to first surface 23 of the port plate and a second side adjacent to rotor face 7. The sheet in this embodiment would have openings which are similar in shape and size to the ports in the port plate, and the first and second sides of the sheet each would have raised regions surrounding each opening that sealably contact rotor face 7 surrounding each opposing opening in the rotor face and sealably contact first surface 23 around opposing ports in the port plate. Alternatively, the elastic sealing means may comprise raised regions of elastic material bonded or attached to the first surface 23 of port plate 19 around each port in the port plate or raised regions of elastic material bonded or attached to rotor face 7 around each opening in the rotor face.

There are also other types of elastic sealing means which may be used for sealing service between rotor face 7 and first surface 23 of port plate 19. For example, seals containing internal springs to provide elasticity could be used, which would provide a seal between the rotor and port plate, and also to provide force to push the port plate against stator face 35. This force should not be affected significantly by flexing of port plate 19 and the flexing of the port plate should be significantly less than the compression of the seals.

Stator face 35 preferably is essentially flat, which means that the face is fabricated to be as flat as practical using conventional machining and grinding methods. Advanced fabrication methods such as lapping or other highly specialized and expensive processes are not required to provide extreme flatness. Stator face 35 and second surface 25 of port plate 19 preferably are smooth to minimize abrasive wear during rotary operation. Stator face 35 has holes or openings 39, 41, and 43 which lead to passages 45, 47, and 49, respectively, through the body of stator 37. Opening 41 and passage 47 typically intersect axis 5. Openings 39 and 43 are disposed at approximately the same selected radial distance from axis 5 as are port 27 in port plate 19 and opening 11 in rotor face 7. Opening 41, port 21, and opening 9 are always aligned and in fluid flow communication when the rotor, port plate, and stator are pressed sealably together. In a first orientation as shown in FIG. 1, opening 39, port 27, and opening 11 are aligned and are in fluid flow communication with opening 41, port 21, and opening 9 by way of bore 13, bore 17, and bore 15. As rotor 1 and port plate 19 rotate to a second orientation (not shown) 180 degrees from the first orientation, opening 43, port 27, and opening 11 are aligned and are in fluid flow communication with opening 41, port 21, and opening 9 by way of bore 13, bore 17, and bore 15.

Rotor 1 and stator 37 may have other multiple openings and passageways (not shown) for other fluid flow functions as described below. Port plate 19 likewise may have additional ports (not shown) for other fluid low functions as described below.

Rotary sequencing valves of the type described above are particularly useful in pressure swing adsorption (PSA) systems utilizing multiple parallel adsorber beds operating in overlapping cyclic steps that include feed, pressure equalization, depressurization, purge, and repressurization steps. Embodiments of the rotary sequencing valve illustrated above may be used in the exemplary four-bed PSA process illustrated in the cycle chart of FIG. 2A and the schematic bed flow diagrams of FIGS. 2B and 2C.

Figure 2A:
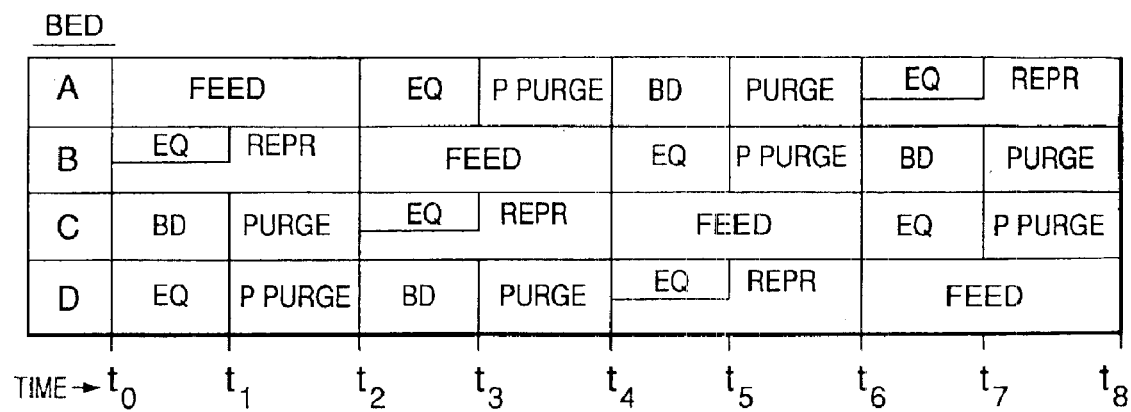
FIG. 2A is a cycle chart of an exemplary pressure swing adsorption process which can be carried out in process equipment utilizing embodiments of the rotary sequencing valves of the present invention.

FIG. 2A shows the overlapping cycle steps for each of beds A, B, C, and D wherein each bed proceeds in turn through the cycle steps during the time periods as shown. Bed A, for example, proceeds through (a) a feed step during time $t_0$ to $t_2$ in which a feed gas is introduced into a feed end of the bed while a product gas is withdrawn from a product end of the bed; (b) an equalization step during time $t_2$ to $t_3$ in which the bed is depressurized through the product end to provide pressurization gas to another bed; (c) a provide purge step during $t_3$ to $t_4$ in which the bed is further depressurized to provide purge gas to yet another bed on the purge step; (d) a waste blowdown step during $t_4$ to $t_5$ in which the bed is further depressurized from the feed end; (e) a purge step during $t_5$ to $t_6$ in which the bed is purged by introducing into the product end a purge gas provided by another bed; (f) a repressurization step during $t_6$ to $t_7$ via the product end with gas from another bed undergoing equalization and with product gas; and (g) a final repressurization step with product gas during $t_7$ to $t_8$.

Figure 2B:
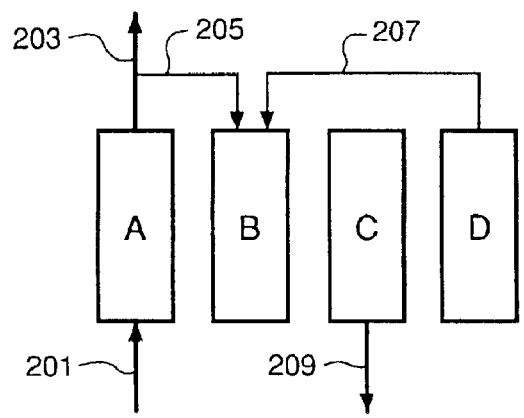
FIG. 2B is a schematic diagram of four adsorber vessels in one of the process steps in the cycle chart of FIG. 2A.

FIG. 2B shows the flow configuration for beds A, B, C, and D during time $t_0$ to $t_1$. Feed flows through line 201 into the feed end of bed A while final product gas is withdrawn via line 203 from the product end of bed A. A portion of the product gas from bed A via line 205 is used to repressurize bed B. Equalization gas flows via line 207 from bed D to bed B. Waste depressurization gas is withdrawn via waste discharge line 209 from bed C.

Figure 2C:
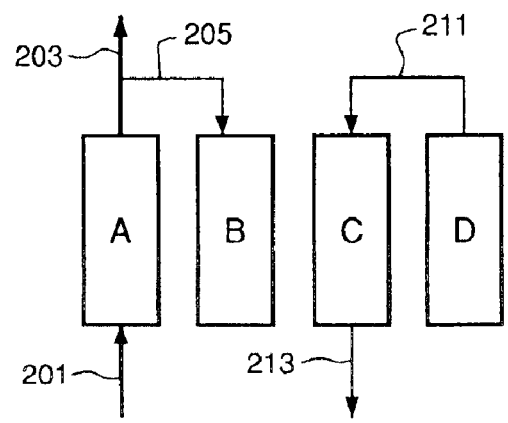
FIG. 2C is a schematic diagram of four adsorber vessels in another of the process steps in the cycle chart of FIG. 2A.

FIG. 2C shows the flow configuration for beds A, B, C, and D during time $t_1$ to $t_2$. Feed flows via line 201 into the feed end of bed A while final product gas is withdrawn via line 203 from the product end of bed A. A portion of the product gas from bed A via line 205 is used to repressurize bed B. Purge gas flows via line 211 from bed D to bed C and waste purge gas is withdrawn via waste discharge line 213 (the same line as line 209) from bed C.

Beds A, B, C, and D cycle in turn through similar bed flow configurations during time periods $t_2$ to $t_4$, $t_4$ to $t_6$, and $t_6$ to $t_8$. The flow of gas among the four beds may be controlled by a rotary sequencing feed valve at the feed ends of the beds and rotary sequencing product valve at the product ends of the beds. An exemplary rotary sequencing product valve for this service is illustrated in the exploded perspective drawing of FIG. 3. A cutaway view of the body of rotor 301 illustrates the openings and internal passages which direct gas at the product ends of the beds. There are six outer holes in the rotor face (not visible here) which are disposed at a selected radial distance from the rotor axis and a single center hole in the rotor face intersecting the axis. The first and second of these outer holes are connected by internal passage 303; the first and second outer holes are connected to the left and right ends, respectively, of internal passage 303. The third of these outer holes is connected to the center hole by internal passage 305. The fourth and sixth of these outer holes are connected by internal passage 307 and bores 309 and 311 respectively. The fifth of these outer holes, which is located in the lower rear area of rotor 301 and is not visible here, is connected to the center hole by passage 313, which passes beneath passage 305. The center hole, the third hole, and the fifth hole therefore are all connected and can be in fluid communication. The face of rotor 301 has at least two drive pins, one of which is visible as drive pin 315. One or more of passages 303, 305, 307, and 313 may have internal orifices (not shown) to regulate the flow of fluid through the passages.

Port plate 317 has center hole 319 opposite the center hole in rotor 301 and at least two drive pin sockets 321 and 323, which are disposed such that the drive pins in the rotor slide into and engage the drive pin sockets when the rotor and the port plate are pressed together axially and disengage when the rotor and the port plate are pulled apart axially. The drive pins and drive pin sockets thus provide disengagable and axially slidable connecting means extending between the rotor face and the flexible port plate. The drive pins rotate port plate 317 in concert with the rotation of rotor 301 and also allow the port plate to move axially with respect to the rotor. This allows the port plate to move slightly in the axial direction to compensate for deviations from flatness of the stator face and from eventual wear of the port plate as it slides rotatably on the stator face. Other types of disengagable and axially slidable connecting means between the rotor and port plate may be envisioned, and are within the scope of the present invention, as long as they provide the dual functions of rotating the port plate and allowing the port plate to move axially with respect to the rotor.

Port plate 317 also has arcuate slots or ports 324, 325, 327, 329, and 331 which are located at approximately the same radial distance from the axis as the six outer holes in the face of rotor 301. The first hole in the rotor face is opposite port 331, the second hole is opposite port 324, the third and fourth holes are opposite port 325, the fifth is opposite port 327, and the sixth is opposite port 329.

Stator face 333 of stator 335 has center hole 337 and holes 339, 341, 343, and 345 located 90 degrees apart and at approximately the same radial distance from the axis as the ports in port plate 317. Each of the holes on the stator face lead to passages through the stator to the underside of the stator (not shown). In the alignment of rotor 301, port plate 317, and stator 335 of FIG. 3, lines and arrows show fluid flow paths through the valve components. For example, it is shown that fluid can flow from hole 345, through port 331, the first hole in the face of rotor 301, passage 303, the second hole in the face of rotor 310, port 324, and hole 339. Also, fluid can flow through hole 343 in the stator face, through arcuate slot 327, through the fifth hole in the rotor face (not seen in this view), and through passage 313. This fluid stream then splits and a portion flows through passage 305, through the third hole in the face of rotor 301, circumferentially through arcuate slot or port 325, and through hole 341. The remaining portion flows through port 319 and through center hole 337 in the face of stator 335.

As rotor 301 and port plate 317 rotate together, with the port plate in contact with stator face 333, the ports in the port plate pass sequentially over the holes in the stator face and direct fluid flow in turn to different combinations of the holes in the stator. The passages from holes 339, 341, 343, and 345 can be connected with the product ends of adsorbent beds C, B, A, and D, respectively, of FIG. 2C. A more detailed description of the fluid flow through the rotary sequencing valve during the segments of the PSA cycle is given below.

Figure 3:
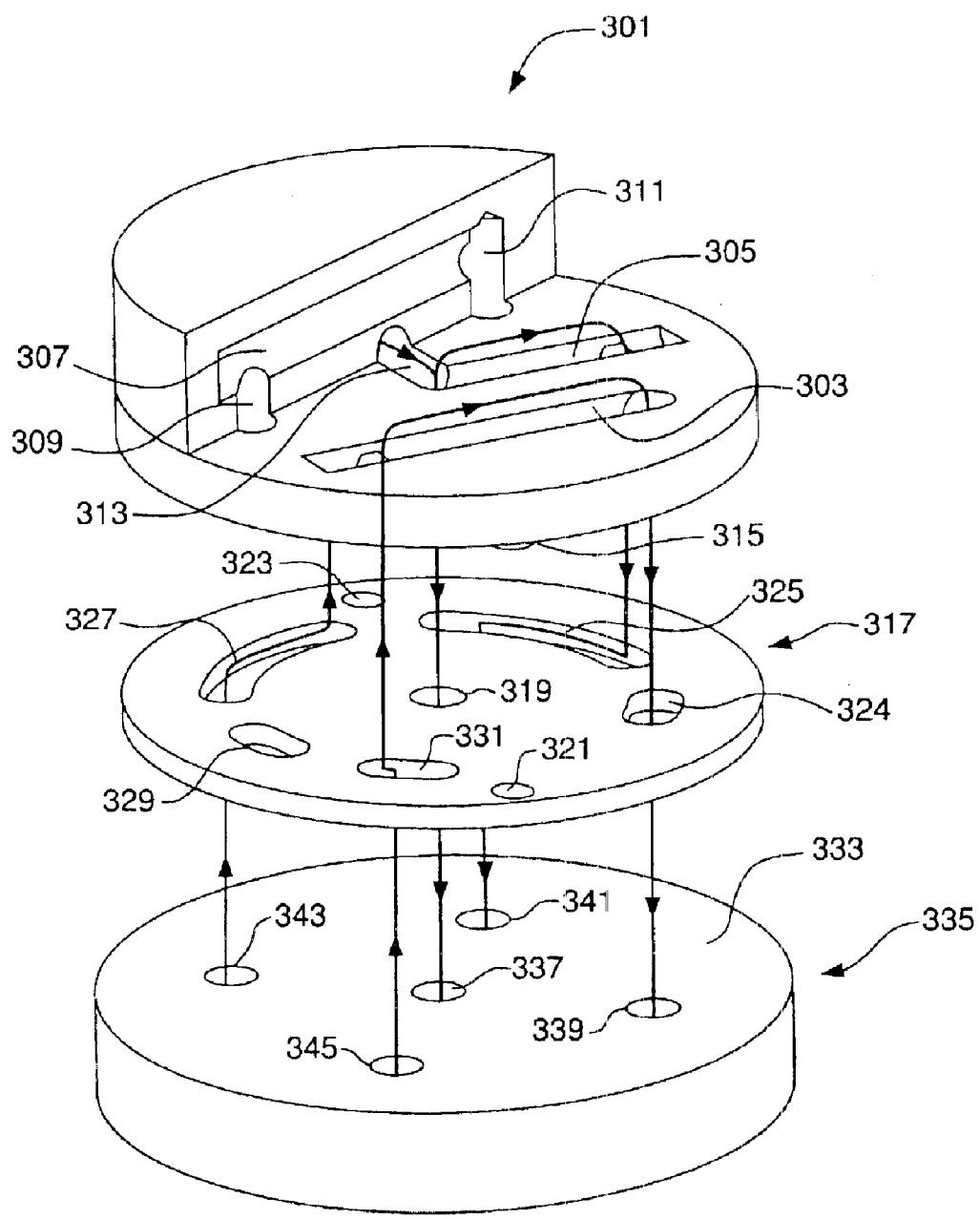
FIG. 3 is a schematic exploded view of an exemplary rotary sequencing product valve of the present invention.
Figure 4:
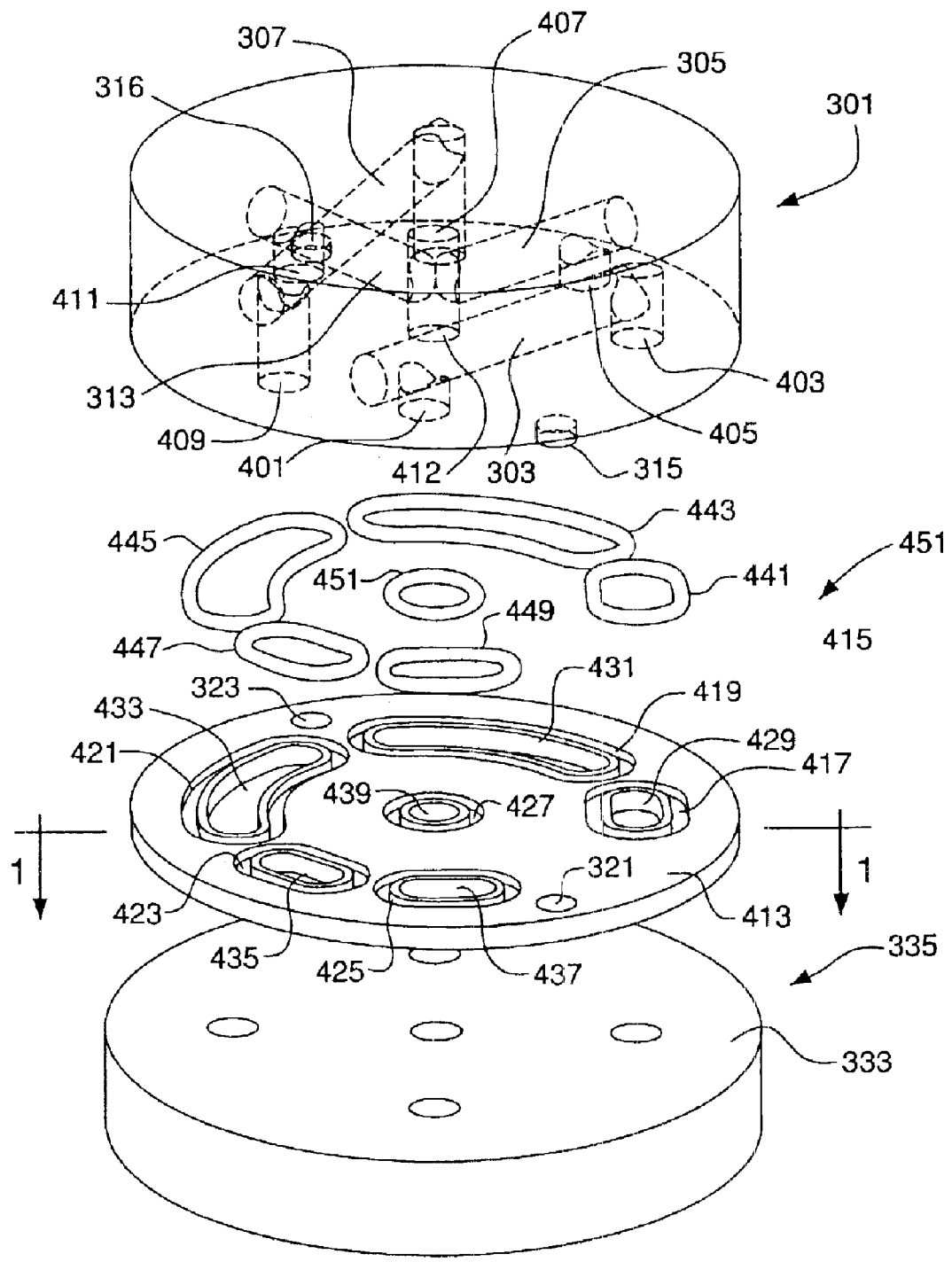
FIG. 4 is a more detailed alternative schematic exploded view of the exemplary rotary sequencing product valve of FIG. 3.

A more detailed view of the exemplary rotary sequencing product valve is illustrated in the exploded perspective drawing of FIG. 4. Rotor 301 is shown with the holes and interior passages drawn in phantom lines. The first, second, third, fourth, fifth, sixth, and center holes in the face of rotor 301 discussed in reference to FIG. 3 are shown in FIG. 4 as holes 401, 403, 405, 407, 409, 411, and 412 respectively. Also shown in FIG. 4 are passages 303, 305, 307, and 313.

An alternative embodiment is possible in which interior passages 303, 305, 307, and 313 within rotor 301 are not used. Instead, passages extend from holes 401, 403, 405, 407, 409, 411, and 412 through the rotor to the top surface of the rotor. External piping is used to connect the holes at the top surface of the rotor to give the same fluid flow paths among the holes as described above using the interior passages. In this alternative, the passage from center hole 412 would have to be set at an angle from the axis to avoid the axial drive shaft (not shown in FIG. 3 but seen in FIG. 1). Alternatively, the drive shaft could be connected to rotor 301 by a hollow spacer and the center passage could be axial.

Grooves are cut in first surface 413 of port plate 415 to contain O-rings as earlier described. Specifically, grooves 417, 419, 421, 423, 425, 427 are cut into first surface 413 surrounding ports 429, 431, 433, 435, 437, and 439, respectively. Drive pin sockets 321 and 323 are shown which receive drive pin 315 and a second drive pin 316 disposed 180 degrees opposite. O-rings 441, 443, 445, 447, 449, and 451 fit into grooves 417, 419, 421, 423, 425, 427, respectively. Stator 335 was described above with reference to FIG. 3.

The O-rings are inserted into the grooves and the face of rotor 301 is pressed against the O-rings while drive pins 315 and 316 are inserted slidably and axially into drive pin sockets 321 and 323. The O-rings contact the rotor face and form seals around the holes in the rotor face. O-ring 441 seals around hole 403, O-ring 443 seals around holes 405 and 407, O-ring 445 seals around hole 411, O-ring 447 seals around hole 409, O-ring 449 seals around hole 401, and O-ring 451 seals around center hole 412. The second surface of port plate 415 contacts and seals against stator face 333 as earlier described.

In an alternative embodiment, the grooves could be cut into the face of rotor 301 around openings therein (not shown) rather than being cut in port plate 415 as described above. The O-rings then would ride in the rotor and press against first surface 413 of port plate 415. Drive pins 315 and 316 would fit into drive pin sockets 321 and 323 as described above.

In another embodiment, the sealing means may comprise a sheet of elastic material having a first side adjacent to first surface 413 of the port plate and a second side adjacent to the face of rotor 301. The sheet has openings which are similar in shape and size to the ports in the port plate, and the first and second sides of the sheet each have raised regions surrounding each opening that sealably contact the face of rotor 301 surrounding each opposing opening in the rotor face and sealably contact first surface 413 around opposing ports in the port plate.

There are also a number of other types of plastic seals which may be used for sealing service between the face of rotor 301 and first surface 413 of port plate 415. For example, seals containing internal springs to provide elasticity could be used, which would provide a seal between the rotor and port plate, and also to provide force to push the port plate against stator face 333. This force should not be affected significantly by flexing of port plate 415 and the flexing of the port plate should be significantly less than the compression of the seals.

The assembled rotary sequencing product valve is installed in a sealed housing (described later) including a drive shaft seal. Any slight leakage of gas through the rotary seal between the port plate and the stator will accumulate in the housing, thereby raising the pressure within the housing. This pressure, acting on the rotor, will force it against the stator, since the pressure at the stator ports is less than the housing pressure. This additional force will further minimize leakage.

A rotary sequencing valve having similar features to the product end rotary valve described above can be designed for the feed end of the adsorber beds. An exemplary rotary sequencing feed valve is illustrated in the exploded perspective drawing of FIG. 5. The face of rotor 501 has two holes or openings 503 and 505 connected by interior passage 507 shown in phantom. Hole 505 is located at the center of the rotor and intersects the axis of the rotor, and hole 503 is located at a selected radial distance from hole 505. At least two drive pins 509 and 511 are mounted on the rotor face. The top of rotor 501 has a drive shaft (not shown) which turns the rotor about a central axis (not shown) which passes through hole 505.

An alternative embodiment of the rotor is possible in which interior passage 507 within rotor 501 is not used. Instead, an external pipe is extended from hole 503 to 505 above the top surface of the rotor to give the same fluid flow paths between the holes as described above using the interior passage. In this alternative, the passage from center hole 505 would have to be set at an angle from the axis to avoid the axial drive shaft (not shown in FIG. 5 but seen in FIG. 1). Alternatively, the drive shaft could be connected to rotor 501 by a hollow spacer and the center passage could be axial.

Port plate 513 has first surface 515 and a second surface (not seen in this view) on the reverse side. The port plate has three ports or openings passing from the first surface to the second surface. Port 517 is in the center of the port plate and intersects the axis, and is surrounded by groove 519. Port 521, generally arcuate in shape, is located approximately at the same selected radial distance as hole 509 in rotor 501 and is surrounded by groove 523. Port 525 is formed by removing a partial segment of the port plate as shown and is open at the circumference of the port plate. The inner edge of port 525 is located at approximately the same radial distance as the inner edge of port 521. First surface 515 has at least two drive pin sockets 527 and 529 which are located to mate with drive pins 511 and 509, respectively, in the face of rotor 501. The first surface of port plate 513 also has two grooves 531 and 533 disposed between ports 521 and 525. Grooves 531 and 533 do not surround ports and may be located at approximately the same radial location as port 521. O-rings 535, 537, 539, and 541 are sized for insertion into grooves 519, 523, 531, and 533, respectively, in first surface 515 of port plate 513.

In an alternative embodiment, the grooves could be cut into the face of rotor 501 around openings therein (not shown) rather than being cut in port plate 513 as described above. The O-rings then would ride in the rotor and press against first surface 515 of port plate 513. Drive pins 509 and 511 would fit into drive pin sockets 529 and 527 as described above.

In another embodiment, the sealing means may comprise a sheet of elastic material having a first side adjacent to first surface 515 of the port plate and a second side adjacent to the face of rotor 501. The sheet has openings which are similar in shape and size to the ports in the port plate, and the first and second sides of the sheet each have raised regions surrounding each opening that sealably contact the face of rotor 501 surrounding each opposing opening in the rotor face and sealably contact first surface 515 around opposing ports in the port plate.

There are also a number of other types of plastic seals which may be used for sealing service between the face of rotor 501 and first surface 515 of port plate 513. For example, seals containing internal springs to provide elasticity could be used, which would provide a seal between the rotor and port plate, and also to provide force to push the port plate against stator face 543. This force should not be affected significantly by flexing of port plate 515 and the flexing of the port plate should be significantly less than the compression of the seals.

Stator face 543 of stator 545 has center hole 547 and holes 549, 551, 553, and 555 located 90 degrees apart at approximately the same radial distance from the axis as the ports in port plate 513. Each of the holes on the stator face lead to passages through the stator to the underside of the stator (not shown). The O-rings are inserted into the grooves and the face of rotor 501 is pressed against the O-rings while drive pins 509 and 511 are inserted into drive pin sockets 529 and 527, respectively. The O-rings contact the rotor face and form seals around the holes in the rotor face. O-ring 535 seals around hole 505 and O-ring 537 seals around hole 503. There is no port in the area surrounded by grooves 531 and 533. O-rings 539 and 541 contact the rotor face and provide the necessary force to the port plate so that the second surface of the port plate maintains sealing contact with the stator face.

The second surface of port plate 513 contacts and seals against stator face 543 as the port plate rotates slidably and sealably against stator face 543. As rotor 501 and port plate 513 rotate, center hole 547 in stator 545 remains aligned with port 517, port 521 is aligned in turn with holes 549, 551, 553, and 555 in stator face 543, and port 525 uncovers in turn each of holes 549, 551, 553, and 555. The passages through stator 545 from holes 549, 551, 553, and 555 can be connected with the feed ends of adsorbent beds B, C, D, and A, respectively, of FIG. 2C. A more detailed description of the fluid flow through the rotary sequencing feed valve during the segments of the PSA cycle is given below.

The assembled rotary sequencing feed valve is installed in a sealed housing similar to that of the rotary sequencing product valve; the housing includes a drive shaft seal for the drive shaft that rotates the rotor. The feed fluid to be distributed by the rotary sequencing feed valve is introduced directly into the valve housing. As port 525 in rotating port plate 513 uncovers in turn each of holes 549, 551, 553, and 555 in stator face 543, the feed fluid is directed into the feed ends of adsorbent beds B, C, D, and A, respectively, of FIG. 2C.

Figure 5:
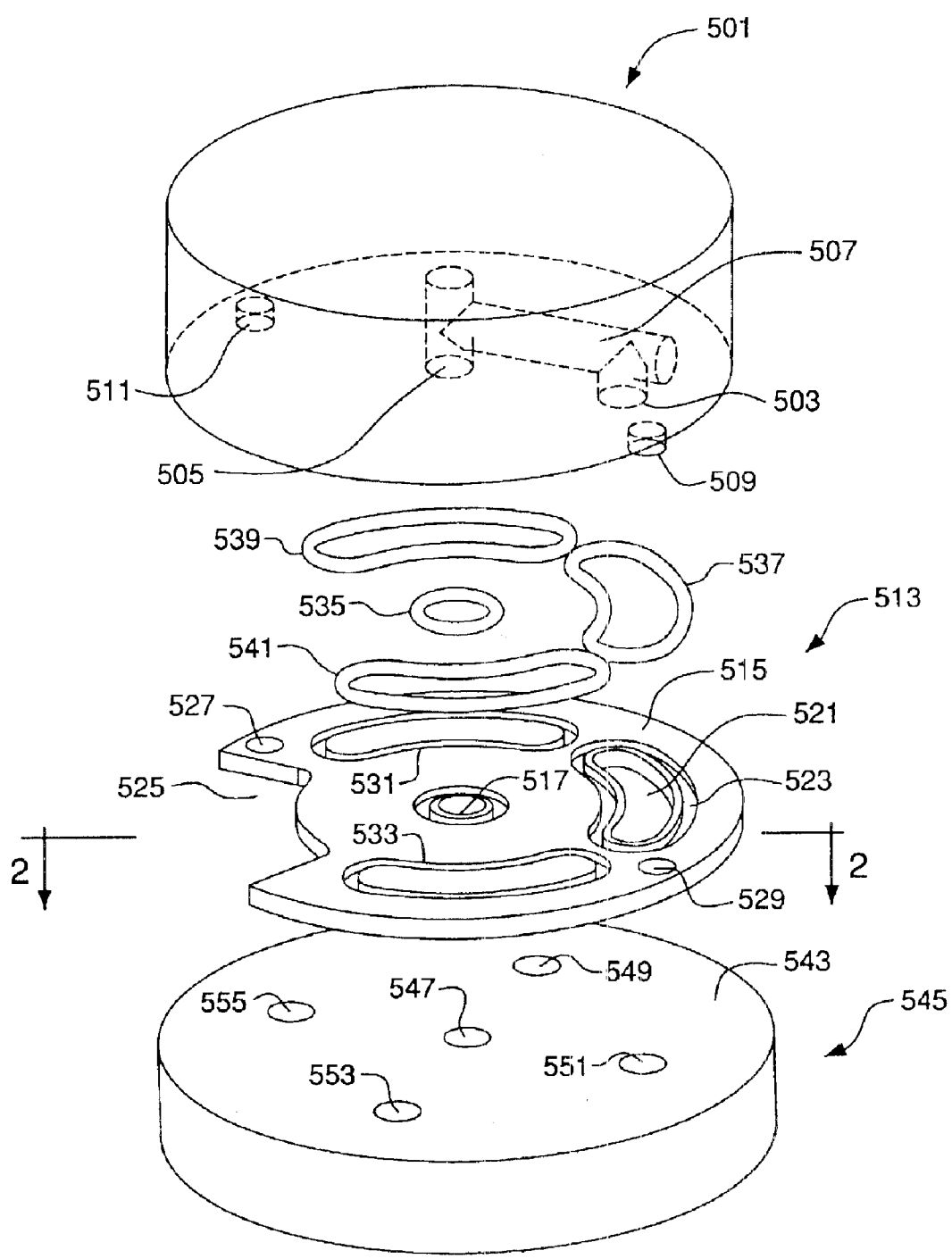
FIG. 5 is a schematic exploded view of an exemplary rotary sequencing feed valve of the present invention.
Figure 6A:
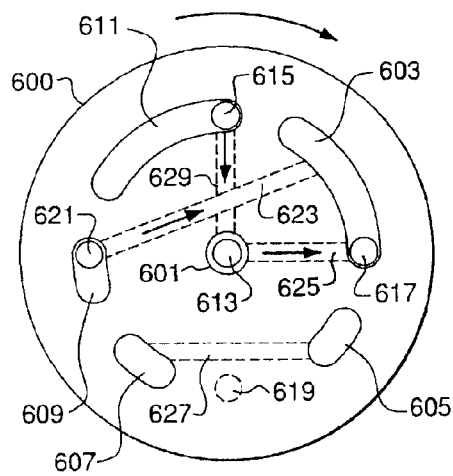
FIG. 6A illustrates a view of the port plate of the rotary sequencing product valve of FIGS. 3 and 4 during one of the process steps in the cycle chart of FIG. 2A.
Figure 6B:
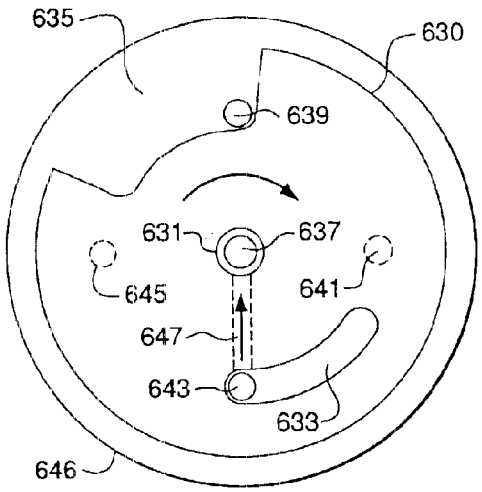
FIG. 6B illustrates a view of the port plate of a rotary sequencing feed valve of FIG. 5 during the same process step illustrated by FIG. 6A.
Figure 7A:
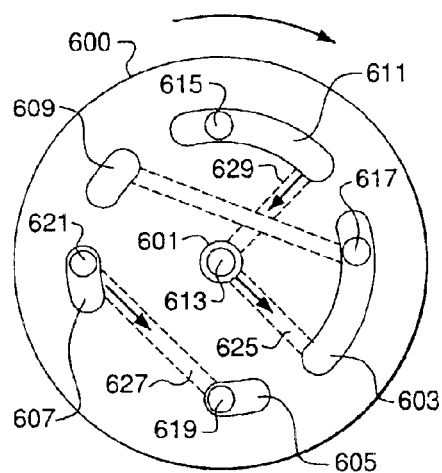
FIG. 7A illustrates another view of the port plate of the rotary sequencing product valve of FIGS. 3 and 4 during another of the process steps in the cycle chart of FIG. 2A.
Figure 7B:
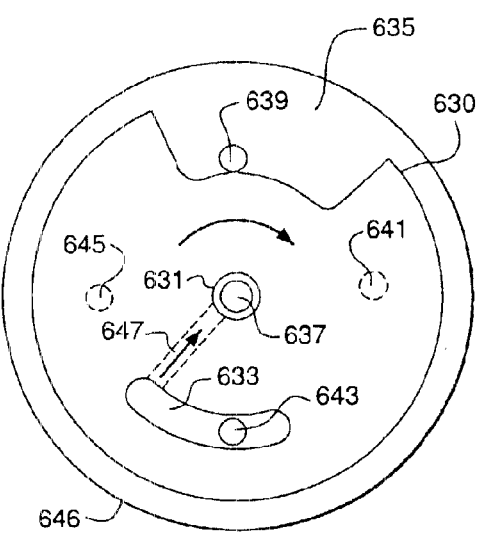
FIG. 7B illustrates a view of the port plate of the rotary sequencing feed valve of FIG. 5 during the same process step illustrated by FIG. 7A.

The operation of the rotary sequencing product valve of FIG. 4 and the rotary sequencing feed valve of FIG. 5 is illustrated in FIGS. 6A, 6B, 7A, and 7B for the pressure swing adsorption cycle of FIGS. 2A, 2B, and 2C. FIGS. 6A and 7A are views of section 1—1 through port plate 415 of FIG. 4 and FIGS. 6B and 7B are views of section 2—2 through port plate 513 of FIG. 5. These views thus include partial views of the stator face. In order to aid the viewer, dashed lines are included to indicate the flow passages in the rotor which connect the ports in the port plate.

Figure 8:
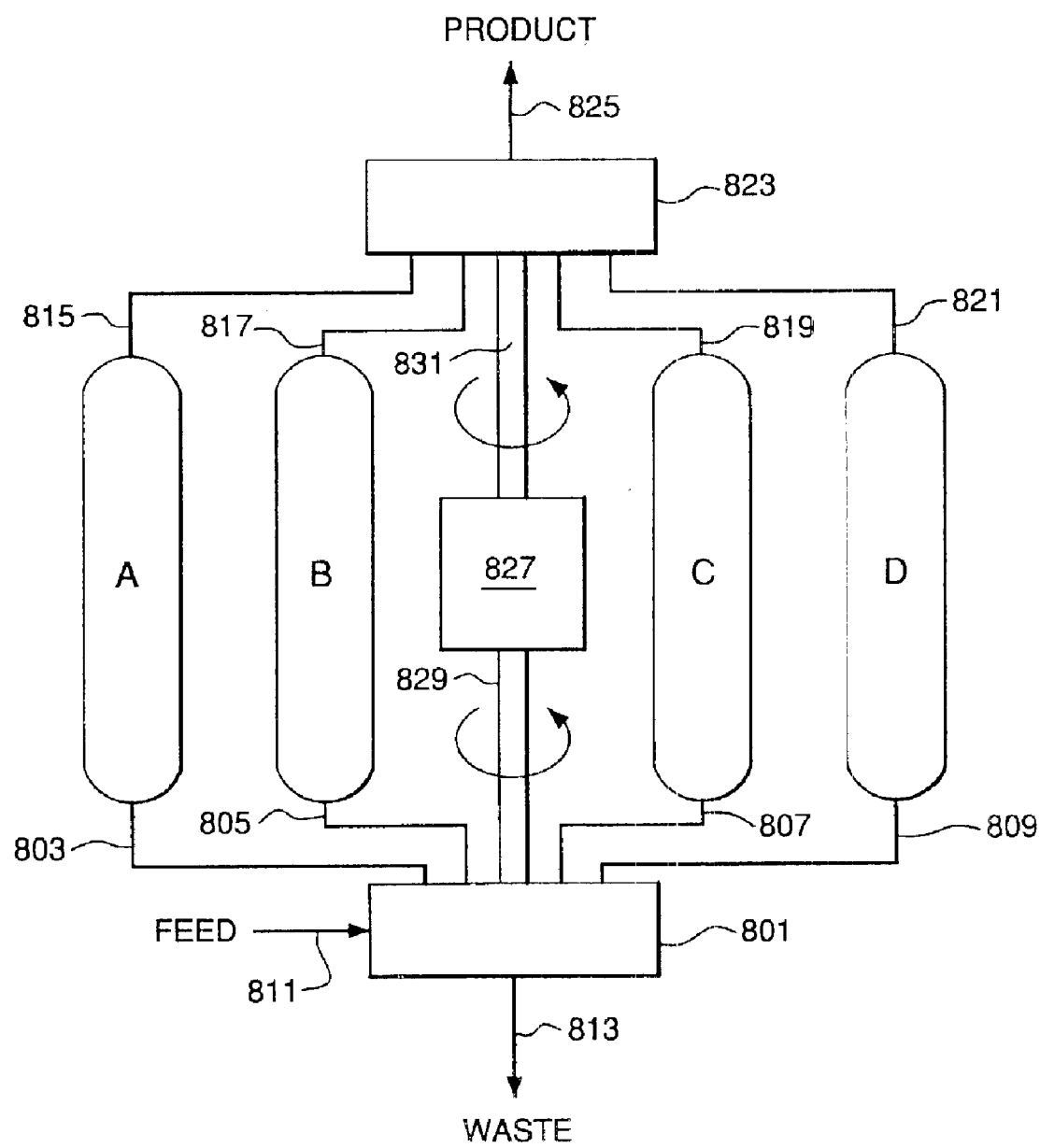
FIG. 8 is a schematic diagram illustrating the integration of a rotary sequencing feed valve and a rotary sequencing product valve with four adsorbent beds of a pressure swing adsorption system.

A schematic flow diagram showing the relationship among the adsorbent beds and the rotary sequencing valves is given in FIG. 8. Rotary sequencing feed valve 801 is connected to the feed ends of beds A, B, C, and D by feed lines 803, 805, 807, and 809, respectively. Feed gas line 811 is connected to the housing of rotary feed valve 801 as earlier described. Waste blowdown line 813 is connected to a center opening in the stator of this valve as earlier described. Bed product lines 815, 817, 819, and 821 connect the product ends of beds A, B, C, and D, respectively, with rotary sequencing product valve 823. Final product line 825 is connected to a center opening in the stator of this valve as earlier described. Rotary drive means 827 drives shafts 829 and 831 which rotate the rotors of valves 801 and 823, respectively. Rotary drive means 827 typically includes an electric motor and a reduction gear drive to rotate shafts 829 and 831 at the speed required by the specific process cycle in which fluid flow is controlled by valves 801 and 823. Valves 801 and 823 typically operate at the same constant rotational speed, but may be operated if desired at a non-constant rotational speed or discontinuously in a repeatable cycle by means of on-off control of the electric drive motor.

FIG. 6A illustrates the relationship of port plate 600 to the stator of the rotary sequencing product valve for the PSA cycle steps of FIG. 2B that occur between times $t_0$ and $t_1$ of FIG. 2A. The port plate has center port 601 and arcuate ports 603, 605, 607, 609, and 611. The stator has center opening 613 and radially-located openings 615, 617, 619, and 621. Passage 623 in the rotor connects ports 609 and 603 in the port plate; passage 625 in the rotor connects ports 601 and 603 in the port plate; passage 627 in the rotor connects ports 605 and 607 in the port plate; and passage 629 in the rotor connects ports 601 and 611 in the port plate. Openings 615, 617, 619, and 621 in the stator are connected to the product ends of adsorber beds A, B, C, and D, respectively, of FIG. 2B. Opening 613 is connected to final product line 825 (FIG. 8).

FIG. 6B illustrates the relationship of the port plate to the stator of the rotary sequencing feed valve for the PSA cycle step of FIG. 2B that occurs between times $t_0$ and $t_1$ of FIG. 2A. Port plate 630 has center port 631, arcuate port 633, and sector port 635. The stator has center opening 637 and radially-located openings 639, 641, 643, and 645. Passage 647 in the rotor connects ports 631 and 633 in the port plate. Openings 639, 641, 643, and 645 in stator 646 are connected to the feed ends of adsorber beds A, B, C, and D, respectively, of FIG. 2B. Opening 637 is connected to a waste blowdown line. Feed is introduced into the valve housing (not shown) as earlier described.

At the product end of the adsorbent beds between times $t_0$ and $t_1$ of FIG. 2A, the rotary product valve of FIG. 6A allows product to flow from the outlet of bed A through product line 815 (FIG. 8), opening 615 in the stator, port 611 in the port plate, passage 629 in the rotor, port 601 in the port plate, and opening 613 in the stator to final product line 825 (FIG. 8), and also through passage 625 in the rotor, port 603 in the port plate, opening 617 in the stator, and line 817 to pressurize the product end of bed B. The rotary product valve also allows depressurization gas to flow from the product end of bed D through line 821, opening 621 in the stator, port 609 in the port plate, passage 623 in the rotor, port 603 in the port plate, and opening 617 in the stator to provide repressurization gas to the inlet of bed B via line 817. Opening 619 in the stator is blocked by the port plate, and ports 605 and 607 in the port plate are blocked by the stator face.

At the feed end of the beds, during the same time period $t_0$ to $t_1$, rotary sequencing feed valve 801 of FIG. 8 allows feed gas to flow from feed line 811 into the housing of the feed valve, through sector port 635 (FIG. 6B), through the uncovered opening 639 in the face of stator 646, and through feed line 803 (FIG. 8) into the feed end of adsorber bed A. Simultaneously, the rotary valve allows blowdown waste gas to flow from the feed end of bed C, through opening 643 in the stator face, through arcuate port 633, through passage 647 in the rotor, through port 631, and through opening 637 in stator 646 to waste line 813 (FIG. 8). Openings 641 and 645 in stator 646 are blocked by port plate 630.

As port plates 600 and 630 rotate clockwise as shown, the PSA cycle of FIG. 2A proceeds through the time period between $t_1$ and $t_2$. The flow relationship among the adsorbent beds during this period is shown in FIG. 2C, wherein feed continues to bed A, product gas continues to repressurize bed B, depressurization gas from the product end of Bed D countercurrently purges bed C, and waste purge gas is withdrawn from the feed end of bed C.

At the product end of the adsorbent beds between times $t_1$ and $t_2$ of FIG. 2A, the rotary product valve of FIG. 7A allows product to flow from the outlet of bed A through product line 815 (FIG. 8), opening 615 in the stator, port 611 in the port plate, passage 629 in the rotor, port 601 in the port plate, and opening 613 in the stator to final product line 825 (FIG. 8), and also through passage 625 in the rotor, port 603 in the port plate, opening 617 in the stator, and line 817 to pressurize the product end of bed B. The rotary product valve also allows depressurization gas to flow from the product end of bed D through line 821 (FIG. 8), opening 621 in the stator, port 607 in the port plate, passage 627 in the rotor, port 605 in the port plate, and opening 619 in the stator to provide purge gas to the product end of bed C via line 819 (FIG. 8). Port 609 is blocked by the face of the valve stator.

At the feed end of the beds, during the same time period $t_1$ to $t_2$, rotary sequencing feed valve 801 of FIG. 8 allows feed gas to flow from feed line 811 into the housing of the feed valve, through port 635 (FIG. 7B), through the uncovered opening 639 in the face of stator 646, and through feed line 803 (FIG. 8) into the feed end of adsorber bed A. Simultaneously, the rotary valve allows blowdown waste gas to flow from the feed end of bed C via feed line 807 (FIG. 8), through opening 643 in the stator face, through arcuate port 633, through passage 647 in the rotor, through port 631, and through opening 637 in stator 646 to waste line 813 (FIG. 8). Openings 641 and 645 in stator 646 are blocked by port plate 630.

Thus during the time periods $t_0$ to $t_1$ and $t_1$ to $t_2$, the rotary valve positions of FIGS. 6A and 6B control gas flow for the feed step of bed A, the equalization and feed pressurization steps of bed B, the waste blowdown and purge steps of bed C, and the equalization and provide purge steps of bed D. As the rotary sequencing feed valve 801 and product valve 825 continue their rotation, this combination of steps proceeds in turn through beds B, C, D, and A during time period $t_2$ to $t_4$, through beds C, D, A, and B during time period $t_4$ to $t_6$, and through beds D, A, B, and C during time period $t_6$ to $t_8$. One full revolution of rotary sequencing feed valve 801 and product valve 825 drives one full cycle of the four-bed PSA system. A typical cycle time $t_0$ to $t_8$ may be in the range of 6 to 120 seconds; the corresponding rotational speed of rotary sequencing feed valve 801 and product valve 825 would be between 10 and 0.5 RPM.

The rotary sequencing valves and parts described above may be assembled into a valve housing using known mechanical sealing methods to ensure fluid-tight operation. An exemplary method of assembling the valve described in FIG. 1 is illustrated in the valve assembly cross-section of FIG. 9. Rotor 901 is driven by drive shaft 903 about axis 905 and its face is in sealable contact with the upper surface of port plate 907 as earlier described, for example, by using representative O-rings 909. The upper surface of port plate 907 and the face of rotor 901 are not in direct contact, and are separated by O-rings 909 and optionally other O-rings not visible in this cross-section view. The lower surface of port plate 907 rotates sealably and slidably on the face of stator 913. Plug 915 may be used to close the outer end of horizontal bore 917 and may include an orifice assembly (not shown) which extends into bore 917 to control the flow of fluid through the bore. The rotor may have additional openings and passageways (not shown) as discussed earlier.

The face of rotor 901 is perpendicular to drive shaft 903 and axis 905, and the face preferably is essentially flat, which means that the face is fabricated to be as flat as practical using conventional machining and grinding methods. Advanced fabrication methods such as lapping or other highly specialized and expensive processes are not required to provide extreme flatness. The rotor face should have a sufficiently smooth finish so that fluid-tight seals can be formed around openings in the face. In one embodiment, at least two drive pins (not seen in this view) project from the rotor face and slidably engage in an axial direction with drive pin sockets in the upper surface of port plate 907. Rotor 901 is attached to the end of drive shaft 903 by threaded stud or bolt 919.

Rotor 901, drive shaft 903, port plate 907, and the face of stator 913 are sealed within a housing formed by the body of stator 913, wall section 921, head 923, and shaft seal and bearing housing 925. Stator 913 is sealed to wall section 921 by seal 927 and wall section 921 is sealed to head 923 by seal 929. Shaft seal and bearing housing 925 is sealed to head 923 by seal 931. Drive shaft 903 is sealed into shaft seal and bearing housing 925 by rotary seal 933 and shaft 903 is supported radially by bearing 935. Stator 913 may be joined to wall section 921 by threaded bolt assemblies 937, head 923 may be joined to wall section 921 by threaded bolt assemblies 939, and bearing housing 925 may be joined to head 923 by bolt assemblies 941.

Axial force may be generated between seal housing 925 and rotor 901 by spring washer 943 which slidably engages with the rotating upper face of rotor 901 by means of roller bearing 945. This force pushes the lower face of rotor 901 against the O-rings in the upper face of port plate 907. Other known means to generate axial force between seal housing 925 and rotor 901, for example by wave springs or helical springs, may be used as desired and are considered within the scope of the embodiments of the present invention.

Figure 9:
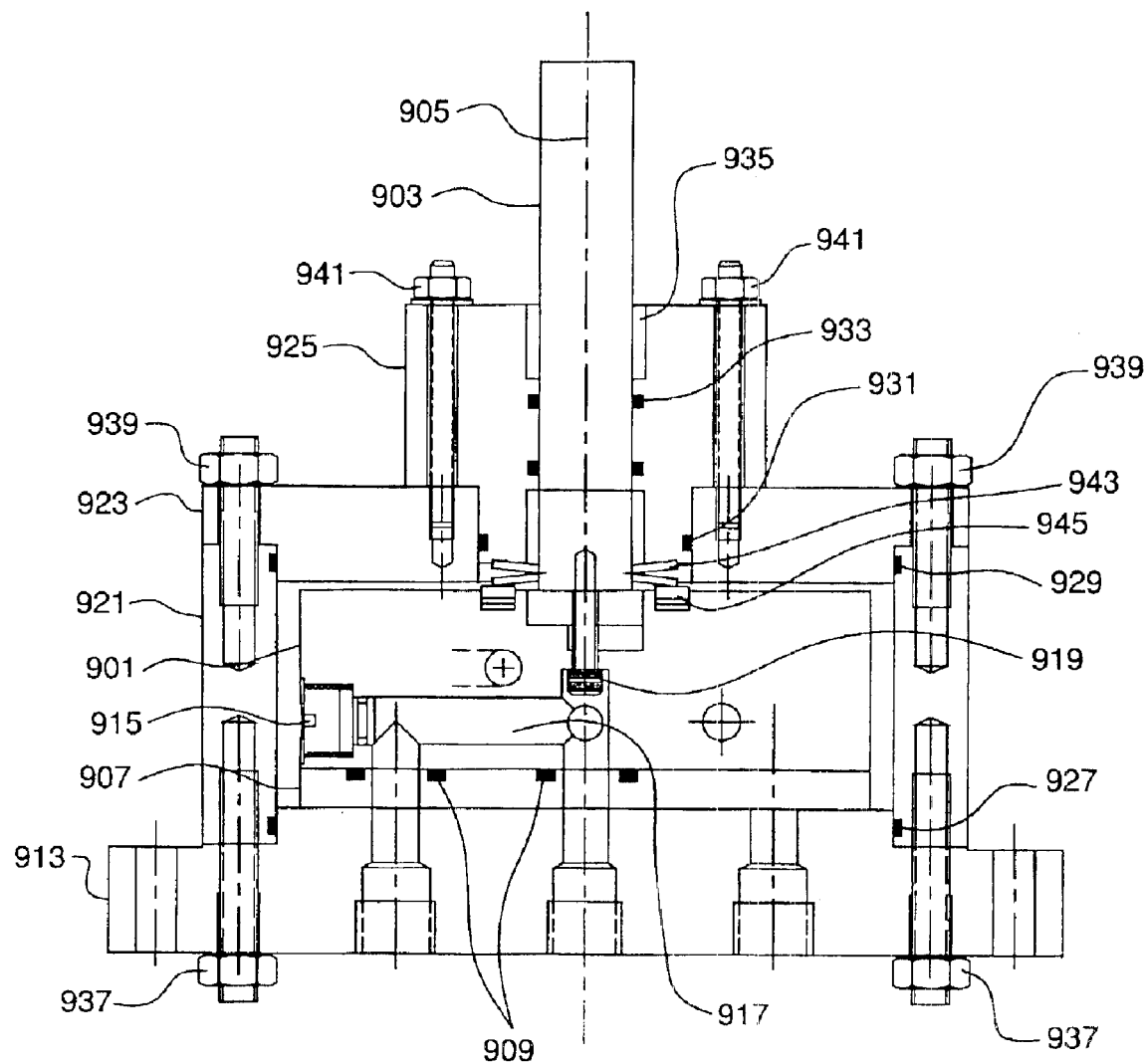
FIG. 9 is cross-sectional view of an exemplary rotary sequencing valve assembly of the present invention.

The features illustrated in FIG. 9 may be used for rotary feed valves as well as rotary product valves. Rotor 901 is representative of product valve rotor 301 of FIG. 4 and feed valve rotor 501 of FIG. 5. Stator 913 is representative of stator 335 of FIG. 4 and stator 545 of FIG. 5. The rotary valve illustrated in FIG. 9 can be operated in any orientation; when used in the configuration of FIG. 8, for example, the orientation shown in FIG. 9 would be used for the feed valve and an orientation rotated 180 degrees would be used for the product valve.

In the embodiments described above and illustrated in FIGS. 1–9, the rotor, port plate, and stator have a center hole intersecting the axis for either product delivery (product valve) or waste gas discharge (feed valve). In an alternative embodiment, for example in a valve configuration in which the rotor drive shaft passes through the stator, the product gas or waste gas passage through the stator would be offset from the axis. In this embodiment, the product delivery or waste gas discharge passage through the stator would be disposed at a different radial location than the passages connected to the adsorbent beds. A circular channel formed in the port plate at a similar radial location as the product delivery or waste gas discharge passage would rotate over the opening to this passage in the stator such that the opening and the circular channel would always be aligned in flow communication. An opening in the rotor would be aligned with the circular channel in the port plate, and this opening would be connected through a passage in the rotor to a port in the port plate which rotates over the face of the stator. This port would align in turn with each passage through the stator leading to each adsorber bed to allow gas flow to or from the bed. Alternatively, a circular channel could be placed in the stator or the rotor to serve the same function as a circular channel in the port plate.

While the rotary valve embodiments described above are illustrated for use in a four-bed pressure swing adsorption process, they may be used with any number of adsorption beds in a PSA system. These rotary valve embodiments are not limited to use in PSA systems, and may be used in any process applications which require the unique characteristics and operating advantages of rotary valves. The embodiments of described herein are particularly useful in larger rotary valves in which the required degree of flatness for rotors and stators operating in direct rotary sliding contact would be difficult or expensive to attain and difficult to maintain during operation.

What is claimed is:

1. A rotary sequencing valve comprising:

(a) a rotor having a rotor face rotatable about an axis perpendicular to the rotor face, wherein the rotor face has a plurality of openings, one or more of which are disposed at a selected radial distance from the axis, and wherein the rotor includes at least one passage connecting at least one pair of the plurality of openings;

(b) a flexible port plate having a first side and a second side, wherein the first side faces the rotor and engages the rotor such that the flexible port plate can be rotated coaxially by the rotor and can move axially with respect to the rotor, wherein the flexible port plate has a plurality of ports between the first and second sides, which ports are aligned with the openings in the rotor face; and (c) a stator having a stator face disposed coaxially with the rotor and the flexible port plate, wherein the second side of the flexible port plate is in sealable, slidable rotary contact with the stator face, wherein the stator face has a plurality of openings, some of which are disposed at the selected radial distance from the axis, and wherein the plurality of openings extend as passages through the stator.

2. The rotary sequencing valve of claim 1 which further comprises flow restricting means disposed in the passage connecting the pair of openings for restricting the flow of fluid through the passage.

3. The rotary sequencing valve of claim 1 wherein one rotary position of the rotor and the port plate about the axis places a pair of openings in the stator in flow communication with a pair of openings in the flexible port plate, the pair of openings in the rotor face, and the passage in the rotor that connects the pair of openings in the rotor face; and another rotary position of the rotor and the port plate about the axis places another pair of openings in the stator in flow communication with the pair of openings in the flexible port plate, the pair of openings in the rotor face, and the passage in the rotor that connects the pair of openings in the rotor face.

4. The rotary sequencing valve of claim 1 wherein one or more of the ports extending through the port plate are arcuate slots, each of which forms a circumferential passageway for fluid flow between an opening in the rotor face and an opening in the stator face.

5. A rotary sequencing valve comprising:

(a) a rotor equipped to rotate about an axis, wherein the rotor includes a rotor face perpendicular to the axis, a plurality of openings in the rotor face, one or more of which are disposed at a selected radial distance from the axis, and a passage extending between a pair of the openings in the rotor face that places the pair of openings in flow communication;

(b) a flexible port plate having a first surface, a second surface, a plurality of ports extending through the port plate from the first surface to the second surface, wherein the ports in the port plate are aligned with the openings in the rotor;

(c) axially slidable connecting means extending between the rotor and the first surface of the flexible port plate such that the rotor and port plate can rotate together about the axis;

(d) elastic sealing means in sealable contact with the rotor face and in sealable contact with the first surface of the flexible port plate, wherein the elastic sealing means provides a seal surrounding each opening in the rotor face and a seal surrounding each port on the first surface of the flexible port plate so that each opening in the rotor face is in flow communication with each port aligned with that opening;

(e) a stator having a stator face disposed coaxially with the rotor and the flexible port plate, wherein the second side of the flexible port plate is in sealable, slidable rotary contact with the stator face, a plurality of openings in the stator face, some of which are disposed at the selected radial distance from the axis, and a plurality of passages extending through the stator, each passage extending through the stator from each of the openings in the stator face, respectively.

6. The rotary sequencing valve of claim 5 wherein one rotary position of the rotor and port plate about the axis aligns a pair of ports with a pair of openings in the stator face, another rotary position of the rotor and port plate about the axis aligns the pair of ports with another pair of openings in the stator face, and yet another rotary position of the rotor and port plate about the axis blocks one or more of the openings in the stator face.

7. The rotary sequencing valve of claim 5 which further comprises rotary drive means for rotating the rotor and port plate.

8. The rotary sequencing valve of claim 7 wherein the rotary drive means can be operated to drive the rotor and port plate continuously at a constant rotational speed or to position the rotor and port plate discontinuously in a repeatable rotational cycle.

9. The rotary sequencing valve of claim 5 wherein the axially slidable connecting means extending between the rotor and the first surface of the flexible port plate comprises cylindrical drive pins on the rotor face which fit into cylindrical drive pin sockets in the first surface of the port plate.

10. The rotary sequencing valve of claim 5 wherein the elastic sealing means is selected from the group consisting of (a) grooves surrounding each opening in the first surface of the port plate and elastic O-rings inserted in the grooves, wherein the O-rings protrude beyond the first surface and sealaby contact the rotor face surrounding each opposing opening in the rotor face;

(b) grooves surrounding each opening in the rotor face and elastic O-rings inserted in the grooves, wherein the O-rings protrude beyond the rotor face and sealably contact the first surface of the port plate surrounding each opposing opening in the port plate;

(c) a sheet of elastic material having a first side adjacent to the first surface of the port plate and a second side adjacent to the rotor face, wherein the sheet has openings which are similar in shape and size to the ports in the port plate, and the first and second sides of the sheet each have raised regions surrounding each opening therein that sealably contact the rotor face surrounding each opposing opening therein and sealably contact the first surface around opposing ports in the port plate;

(d) raised regions of elastic material attached to the first surface of the port plate around each port in the port plate; and (e) raised regions of elastic material attached to the rotor face around each opening in the rotor face.

11. The rotary sequencing valve of claim 5 which further comprises means for pressing the rotor face against the elastic sealing means.

12. A rotor and port plate assembly for use in a rotary sequencing valve comprising: (a) a rotor equipped to rotate about an axis, wherein the rotor includes a rotor face perpendicular to the axis, a plurality of openings in the rotor face including a first opening and a second opening, and a passage extending between the first opening and the second opening that places them in flow communication, wherein one or more of the openings in the rotor face are disposed at a selected radial distance around the axis;

(b) a flexible port plate having a first surface, a second surface, a plurality of ports extending through the port plate including a first port and a second port, wherein the first opening in the rotor face is aligned with the first port in the port plate and the second opening in the rotor face is aligned with the second port in the port plate;

(c) axially slidable connecting means extending axially between the rotor and the first surface of the flexible port plate such that the rotor and the port plate can rotate together about the axis; and (d) elastic sealing means in sealable contact with the first surface of the flexible port plate and with the rotor face.

* * * * *